(12) United States Patent
Frock et al.

(10) Patent No.: US 7,853,130 B2
(45) Date of Patent: Dec. 14, 2010

(54) STEAM GENERATOR FOR A STEAM COOKER HAVING AN AUTOMATED DRAINING PROCESS

(75) Inventors: Jeffrey L. Frock, Troy, OH (US); Atul Saksena, Troy, OH (US); Richard E. Chitwood, Troy, OH (US)

(73) Assignee: Premark FEG L.L.C., Wilmington, DE (US)

( * ) Notice: Subject to any disclaimer, the term of this patent is extended or adjusted under 35 U.S.C. 154(b) by 592 days.

(21) Appl. No.: 11/392,145

(22) Filed: Mar. 29, 2006

(65) Prior Publication Data
US 2008/0008807 A1 Jan. 10, 2008

(51) Int. Cl.
*A47J 27/00* (2006.01)
(52) U.S. Cl. .................................................. 392/441
(58) Field of Classification Search ................. 392/441, 392/442, 444, 445, 446, 447, 448, 449, 450
See application file for complete search history.

(56) References Cited

U.S. PATENT DOCUMENTS

| | | | |
|---|---|---|---|
| 685,624 | A | 10/1901 | Manley |
| 1,520,501 | A | 12/1924 | Kohn |
| 1,548,781 | A | 8/1925 | Jones |
| 1,849,737 | A | 3/1932 | Weis |
| 2,213,464 | A | 9/1940 | Fogwell |
| 2,597,597 | A | 5/1952 | Rice |
| 2,606,995 | A | 8/1952 | Trubert |
| 2,801,324 | A | 7/1957 | Ware |
| 3,132,631 | A | 5/1964 | Holman et al. |
| 3,450,860 | A | 6/1969 | Kneisley |
| 3,512,507 | A | 5/1970 | Dixon |
| 3,579,262 | A | 5/1971 | Peeps |
| 3,682,141 | A | 8/1972 | Johansen |
| 3,762,395 | A | 10/1973 | Taylor |
| 3,908,605 | A | 9/1975 | Andersen |
| 4,090,054 | A | 5/1978 | Heine et al. |
| 4,157,077 | A | 6/1979 | Lindahl |
| 4,238,666 | A | 12/1980 | Pomper |
| 4,243,870 | A | 1/1981 | Grime et al. |
| 4,257,355 | A | 3/1981 | Cook |
| 4,281,636 | A | 8/1981 | Vegh et al. |
| 4,287,407 | A | 9/1981 | Treiber et al. |
| 4,724,824 | A | 2/1988 | McCoy et al. |

(Continued)

FOREIGN PATENT DOCUMENTS

GB 2204787 A 11/1988

(Continued)

OTHER PUBLICATIONS

IDS Submission—Rational Boilers Manufactured in 2004 and 2006 (9 Pages).

*Primary Examiner*—Daniel Robinson
(74) *Attorney, Agent, or Firm*—Thompson Hine LLP

(57) ABSTRACT

A steam generator includes a heating chamber for holding water. The heating chamber has a water inlet, a steam outlet, and a water draining outlet. A nozzle is in communication with the water inlet and is positioned to direct incoming water into the water draining outlet. A heating system is associated with the heating chamber for heating water to generate steam and a control system is operable to control filling and draining of the heating chamber.

21 Claims, 4 Drawing Sheets

U.S. PATENT DOCUMENTS

| | | |
|---|---|---|
| 4,823,767 A | 4/1989 | Wüst |
| 4,938,174 A | 7/1990 | Bennett |
| 4,991,545 A | 2/1991 | Rabe et al. |
| 5,118,927 A | 6/1992 | Eisenhauer |
| 5,225,086 A | 7/1993 | Vuletic |
| 5,279,676 A * | 1/1994 | Oslin et al. ................ 134/22.1 |
| 5,313,876 A * | 5/1994 | Hilger et al. ................... 99/330 |
| 5,341,770 A | 8/1994 | Lannes |
| 5,609,124 A | 3/1997 | Leclerc |
| 5,661,884 A | 9/1997 | Thomas |
| 5,748,836 A | 5/1998 | Moore et al. |
| 5,921,207 A | 7/1999 | DiSalvo et al. |
| 6,058,926 A * | 5/2000 | Ruiz ............................ 126/33 |
| 6,073,591 A | 6/2000 | Theriault |
| 6,267,085 B1 | 7/2001 | Alphs |
| 6,390,029 B2 | 5/2002 | Alphs |
| 6,508,208 B1 | 1/2003 | Frasure et al. |
| 6,655,322 B1 | 12/2003 | Godwin et al. |
| 6,715,216 B1 * | 4/2004 | Salameh et al. ................ 34/350 |
| 6,772,751 B2 | 8/2004 | Deuringer et al. |
| 7,316,038 B2 * | 1/2008 | Egeresi ....................... 4/420.4 |
| 2003/0145847 A1 | 8/2003 | Deuringer et al. |
| 2004/0144259 A1 | 7/2004 | Kim |

FOREIGN PATENT DOCUMENTS

| | | |
|---|---|---|
| WO | WO 02/091890 A1 | 11/2002 |

* cited by examiner

STEAM GENERATOR FOR A STEAM COOKER HAVING AN AUTOMATED DRAINING PROCESS

TECHNICAL FIELD

The present application relates generally to steam cookers and steam generators used in steaming food products, and more particularly to a steam cooker with steam generator having an automated draining process.

BACKGROUND

Steam cooking systems have been successfully employed by restaurants, hospitals and other food service operations to prepare quickly and conveniently large quantities of food. Many such cookers are used in high volume situations. Typical steam cooking systems include a steam cooker boiler that is used to generate steam. The boiler includes a heating element that is used to heat water located in the boiler. The steam is delivered to a cooking chamber having food located therein. Often times, water is maintained at a pre-selected level within the steam cooker boiler by refilling the boiler with water as the water, in the form of steam, exits the boiler. Occasionally, the water is drained from the boiler along with sediment that may accumulate in the boiler. It is desirable to provide steamers with reduced maintenance requirements.

SUMMARY

In one aspect, a steam generator includes a heating chamber for holding water. The heating chamber has a water inlet, a steam outlet, and a water draining outlet. A nozzle is in communication with the water inlet and is positioned to direct water into the water draining outlet. A heating system is associated with the heating chamber for heating water to generate steam and a control system is operable to control filling and draining of the heating chamber.

In another aspect, a method of draining a steam generator is provided. The method includes providing a water inlet nozzle within the steam generator at a location for directing water into a water draining outlet of the steam generator. A drain valve associated with the water draining outlet is opened to permit hot water to drain from the steam generator. An inlet valve that delivers water to the water inlet nozzle is opened so that water is directed into the water draining outlet while water drains from the steam generator.

In another aspect, a steam cooker includes a steam generator. The steam generator includes a tank structure providing a heating chamber for holding water. The heating chamber includes a water inlet and a steam outlet. A top mounted heating element extends downwardly through a top of the tank structure at a location above a pre-selected water fill line of the heating chamber. The heating element extends downwardly below the pre-selected water fill line in order to heat water in the heating chamber so as to generate steam. A steam cooking chamber is plumbed for receiving steam from the steam outlet of the steam generator.

DETAILED DESCRIPTION

Figure 1:
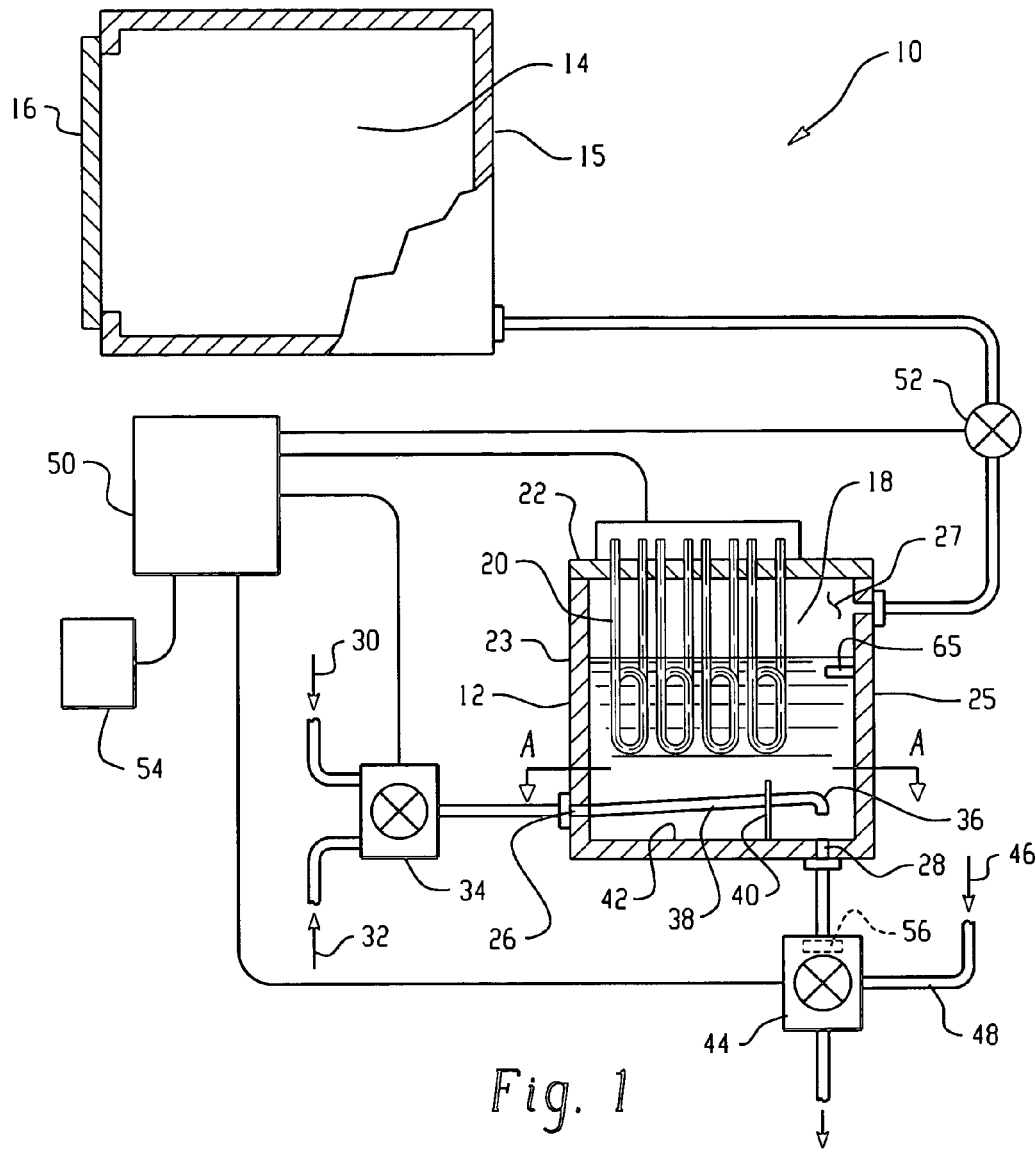
FIG. 1 is schematic illustration of a steam cooker including an embodiment of a steam generator.
Figure 1A:
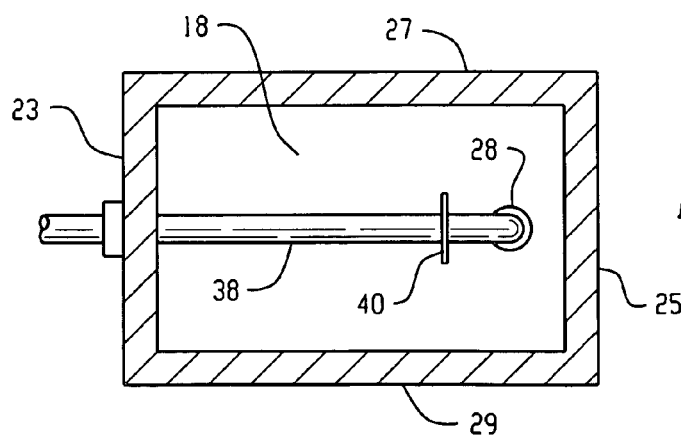
FIG. 1A is a top, section view of the steam generator along line A-A of FIG. 1.

Referring to FIG. 1, a low-pressure steam cooker 10 includes a steam generator 12 for generating steam and a cooking chamber 14 that is in communication with the steam generator. The cooking chamber 14 may be formed by an insulated housing 15 and includes a door 16 that is movable between open and closed positions to provide and inhibit access to the cooking chamber. The steam generator 12 includes opposing minor sidewalls 23, 25, opposing major sidewalls 27, 29 and a heating chamber 18 where water is heated to generate steam (see FIG. 1A showing the steam generator 12 having an elongated box shape). In some embodiments, a steam superheater (not shown) may be included that is capable of superheating the steam generated in the heating chamber.

Disposed within the heating chamber 18 of the illustrated embodiment is a group (i.e., more than one, such as four) of top mounted heating elements 20 that extend downwardly from a top plate 22 of the steam generator 12 forming a lid-type assembly. In other embodiments, less than four such as one heating element 20 or more than four heating elements may be used. The heating elements 20 form part of an electric circuit that is used to heat water located in the heating chamber 18 to generate steam.

The steam generator 12 includes an inlet 26, which in the illustrated embodiment is an opening in the steam generator wall through which an inlet pipe passes, for ingress of water into the heating chamber 18 from a water source (as when the heating chamber is to be filled or cleaned) and an outlet 28 for egress of water from the heating chamber (as when the chamber is to be drained). Inlet 26 can receive water from a filtered water source as represented by arrow 30 and an unfiltered water source as represented by arrow 32. An inlet flow control device 34 is located between the inlet 26 and both water sources to allow for selection between filtered and unfiltered water and to generally control the flow of water to the inlet 26.

Inlet 26 is in communication with a discharge nozzle 36 located at an end of a conduit or pipe 38 connected to the inlet. A support member (e.g., bracket 40) is used to support the conduit 38 above bottom 42. In the illustrated embodiment, conduit 38 extends from the inlet 26, which is located at one side of the heating chamber 18, to a water outlet 28 that is located at an opposite side of the heating chamber. Discharge nozzle 36, which in one example may simply be the open end of the conduit 38 or in another example may be a restricted opening in a member placed at the end of the conduit 38, is positioned above the water outlet 28 so as to direct water flowing from the inlet 26 downwardly at the water outlet. As used herein, the term nozzle broadly encompasses an opening for egress of water. A drain flow control device 44 (e.g., a valve) is used to control water drainage from the heating chamber 18. In some embodiments, drain flow control device 44 may also control flow of cooling water from a water source (represented by arrow 46) that is connected to conduit 48, or in the alternative a separate valve may be utilized for such purpose.

A control system 50 is shown connected to the inlet flow control device 34, the drain flow control device 44, the heating elements 20 and a steam control valve 52. The devices 34 and 44 may include any suitable valve capable of being electronically controlled, such as a solenoid valve or other electromechanical valve. Control system 50 is used to control flow of water to the heating chamber 18 through the inlet 26 and from the heating chamber through the outlet 28 and may also be used to activate and deactivate the heating elements 20 (e.g., in response to an indication received from a user interface 54 including a generator OFF/ON input).

A temperature sensor 56 may be used to monitor water temperature. Temperature sensor 56 may be located at drain valve 44 and/or at any other suitable location for monitoring water temperature such as within heating chamber 18. Temperature sensor 56 is capable of providing a signal to the control system 50 that is indicative of water temperature, for example, to allow for monitoring of water temperature as heated water is drained from the heating chamber 18. Also, a pre-selected water or fill level may be set. The fill level may be monitored using a water level sensor 65 (or multiple water level sensors) that provides an indication to the control system 50 of the level of the water within the heating chamber 18. The sensor may be within the main heating chamber 18 as shown, or could be contained in a housing unit that is placed alongside the main heating chamber and incldes a path of fluid communication with the heating chamber (as might be provided by tubing).

Figure 2:
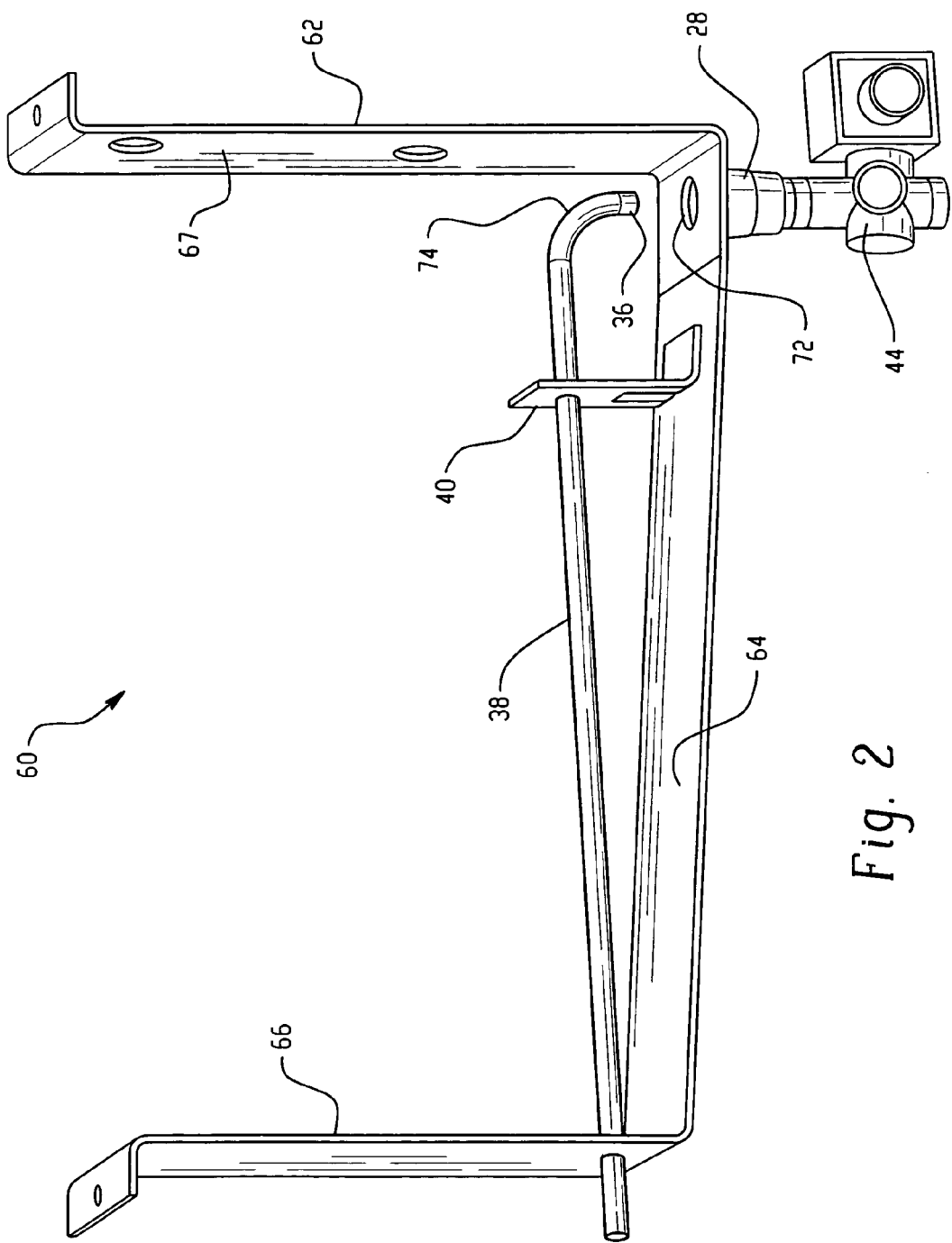
FIG. 2 is a perspective side view of an embodiment of a discharge assembly for use with the steam generator of FIG. 1.

Referring to FIG. 2, an exemplary discharge nozzle assembly 60 is shown isolated from the heating chamber 18. Discharge nozzle assembly 60 includes a U-shaped mounting bracket 62 with a bottom plate 64 and arms 66, 67 that extend vertically from the bottom plate 64. Flanges 68, 70 extend horizontally from the arms 66, 67 and are used to mount the assembly 60 within the heating chamber 18. An opening 72 extends through the bottom plate 64 to expose the water outlet 28 and allow for drainage of water through the drain flow control device 44. Bottom plate 64 is angled downward toward the opening 72 to encourage movement of sediment toward the opening. In some embodiments, the U-shaped bracket 62 actually forms the minor sidewalls 23, 25 and bottom wall 42 and the opening 72 forms the water outlet 28, with the major sidewalls being welded to the U-shaped bracket to form the heating chamber 18. As installed, the bottom plate 62 or wall of the generator may be inclined slightly as shown in FIG. 2 to aid flow of small solids down toward the outlet 28.

The discharge nozzle 36 is located directly above the opening 72 and is connected to the conduit 38 via bend 74. Bracket 40 supports the conduit 38 and discharge nozzle 36 at their illustrated positions. As will be described below, the discharge nozzle 36 is positioned so that streams of incoming water (e.g., cold water having a temperature of less than about 20° C., less than about 15° C., less than about 10° C.) can be directed directly at the water outlet 28 which can loosen and break scale build-up and other debris therefrom. In some implementations, water in the form of water pulses (e.g., having a frequency of 15 or more per minute, 30 or more per minute, 45 or more per minute) are directed into at the water outlet 28. These water pulses can serve to cool the heated water within the heating chamber 18 and also provide improved capacity to break scale build-up and other debris from the outlet 28 and valve of the flow control device 44. Pulsing of the incoming water takes advantage of the initial water velocity surge when water begins to flow to generate a repetitive impact force on the drain valve.

Figure 3:
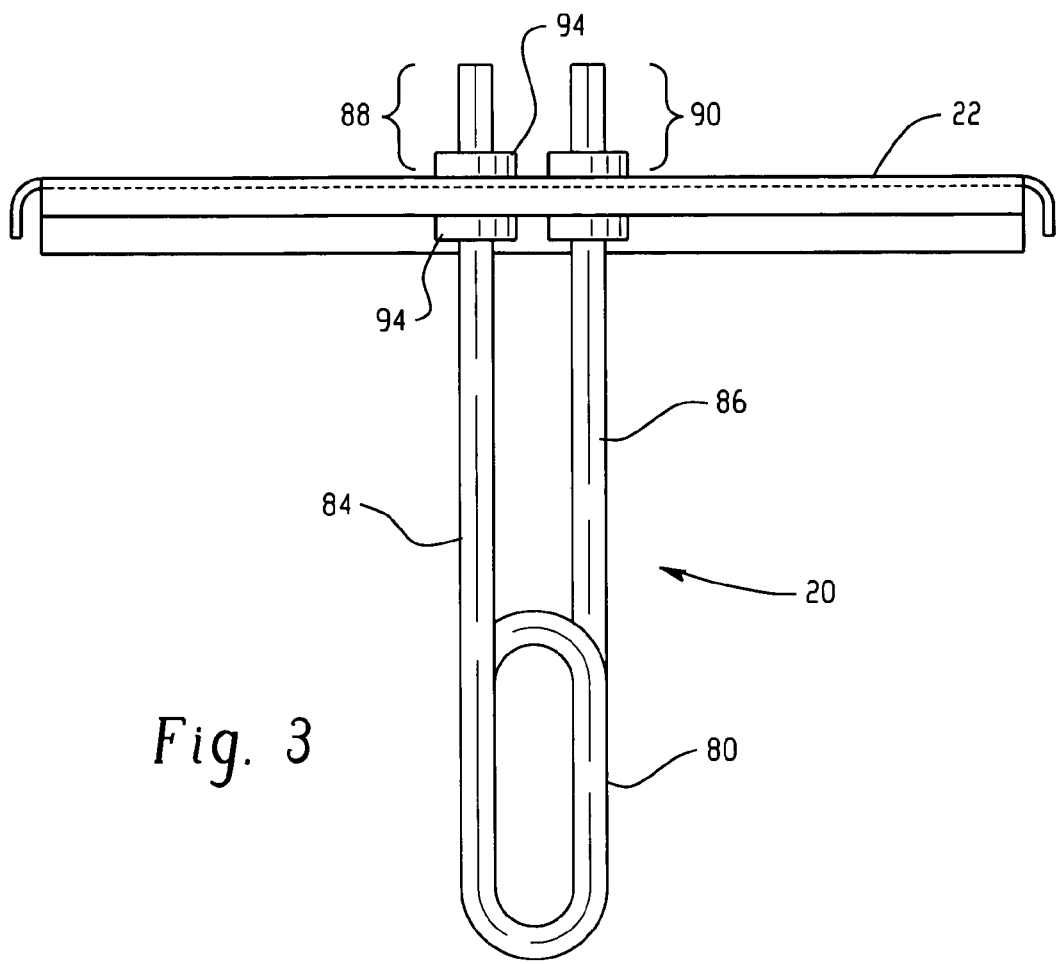
FIG. 3 is an end view of an embodiment of a lid-type assembly for use in mounting heating elements within the steam generator of FIG. 1.
Figure 4:
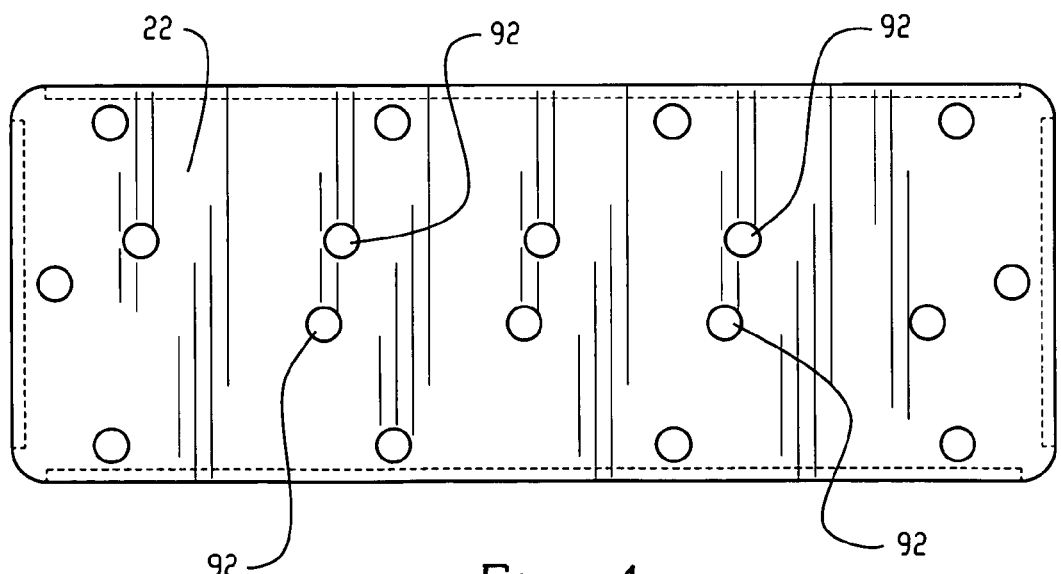
FIG. 4 is a top view of the lid of FIG. 3.

Referring now to FIG. 3, heating element 20 for heating water located in the heating chamber 18 (FIG. 1) includes a coil 80 and leads 84 and 86 that extend outwardly from the coil. The leads 84, 86 extend through top plate 22 or lid with portions 88, 90 extending beyond the top plate. Referring also to FIG. 4, top plate 22 includes openings 92 that are sized to receive the leads 84, 86 of each of the four heating elements 20 (FIG. 1). Sealing members such as gaskets 94 or epoxy can be placed between the leads 84, 86 and the top plate 22 to form seals that prevent the escape of steam from the heating chamber 18. It should be appreciated that mounting the heating elements 20 from the top plate 22 reduces concern for water leaks from heating chamber 18 as compared to, for example, a side-mounted heating element by locating the seals above the water or fill line. Also, by providing multiple heating elements 20 more than one heating element 20 can be connected to the same power source (e.g., providing 208 V or 240 V) without increasing likelihood of water leakage.

Figure 5:
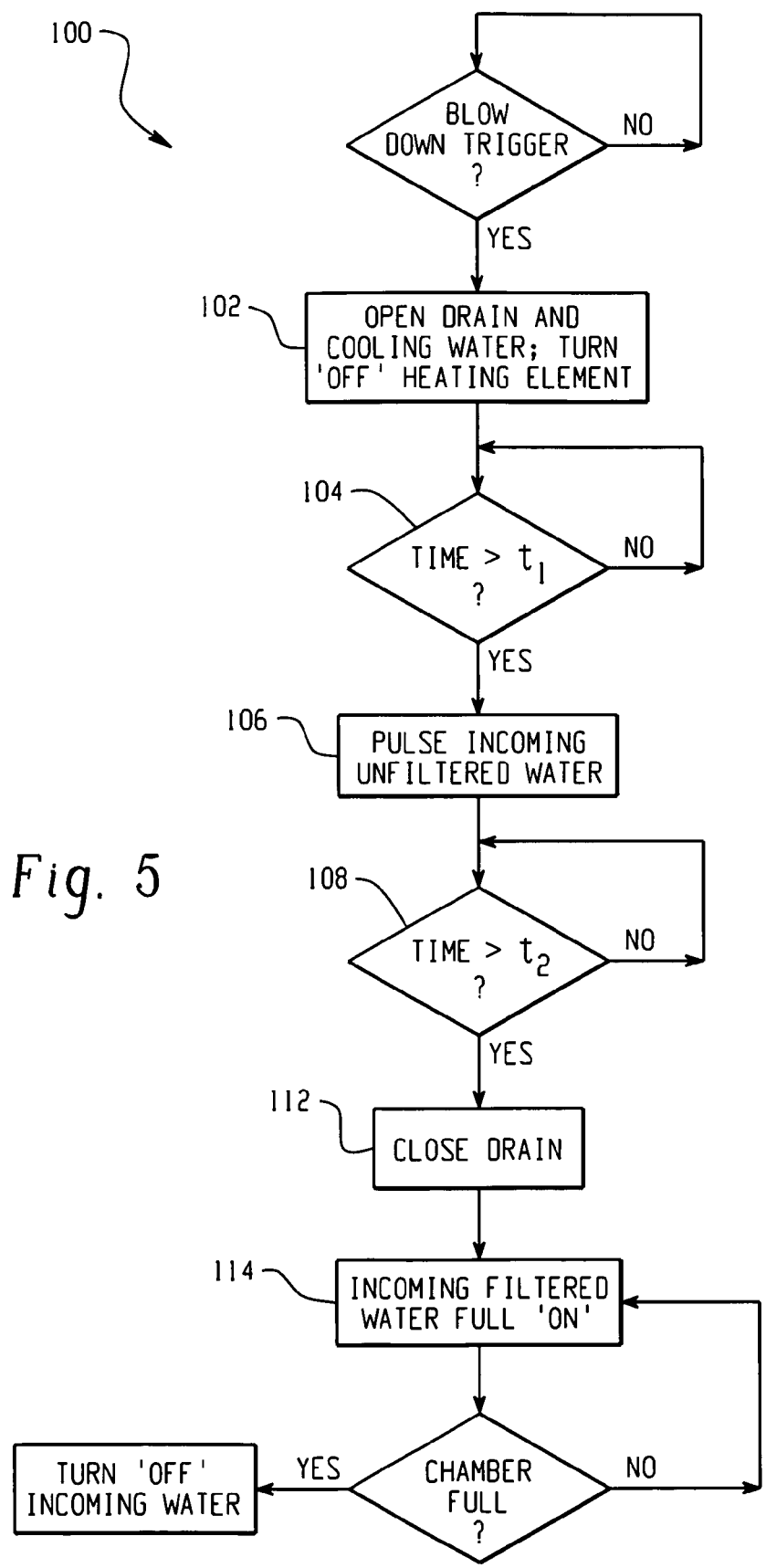
FIG. 5 is an embodiment of a process of draining the steam generator of FIG. 1.

FIG. 5 shows an exemplary process diagram for draining the heating chamber 18 of the steam cooker 10. In the illustrated process 100, the draining operation is automatically started at step 102 in response to a blow down trigger, which may be deactivation of the steam cooker 10, for example, manually using an interface or automatically (e.g., at a certain time using a timer). Upon deactivation of the steam cooker 10, an indication is sent to the control system 50 that the steam cooker is deactivated. In response to this indication, at step 102 the control system 50 deactivates the heating elements 20 and opens the drain valve of the drain flow control device 44 to allow cooling water (from site plumbing) to flow through the conduit 48 for mixing with the heated water that is drained from the heating chamber 18. In some embodiments, the cooling water may be eliminated. The inlet flow control valve 34 is maintained closed, preventing inlet of water during initial draining of the generator. The cooling water 46 may be used to reduce the temperature of the heated water flowing through the water outlet 28 if necessary to comply with local code requirements. After a specified time $t_1$ (as determined at step 104), the control system 50 opens and closes the inlet valve of the inlet flow control device 34 repeatedly at step 106, producing incoming pulses of cold, unfiltered water to discharge from the discharge nozzle 36 toward the water outlet 28 to aid in pushing solids through the drain valve 44. Alternatively, the pulsing could be initiated simultaneous with opening of the drain valve. Pulsing of the incoming water continues until time $t_2$ (as determined at step 108), at which time the drain valve of the drain flow control device 44 is closed at step 112 and at step 114 the inlet valve of the inlet flow control device 34 is opened to allow for discharge of a continuous stream of filtered water from the filtered water source to refill the heating chamber 18. Once it is determined that the heating chamber 18 is filled to the fill line, e.g., using fill sensor, timer, etc., the inlet valve of the inlet flow control device 34 is closed to stop the flow of filtered water into the heating chamber. In the above-described process time $t_1$ may, in one embodiment, be selected such that pulsing of the incoming water begins when the level of water within the generator is still above the position of the nozzle 36 and time $t_2$ may be selected to assure that heated water has completely drained from the generator. In some embodiments, $t_2$ may be selected so that water continues pulsing from the nozzle 36 after all the heater water has drained from the generator. However, variations are possible. Moreover, additional water level sensors could be utilized in place of the described timed operation.

The above-described system and method provides for automated draining of the steam generator 14 that can also aid in breaking scale and debris build-up from the water outlet 28 an particularly in the drain valve. In another embodiment, the pipe 38 may include a plurality of small openings along its length to aid in breaking scale from the sidewalls of the generator.

It is to be clearly understood that the above description is intended by way of illustration and example only and is not intended to be taken by way of limitation. Other changes and modifications could be made.

What is claimed is:

1. A steam generator comprising:
a heating chamber for holding water, the heating chamber having a water inlet in a side wall of the chamber, a steam outlet, and a water draining outlet in a bottom wall of the heating chamber, a nozzle in communication with the water inlet via a pipe that extends from the side wall within the heating chamber and toward the water draining outlet to position the nozzle directly above the water draining outlet to direct water downwardly into the water draining outlet;
a heating system associated with the heating chamber for heating water to generate steam and having at least one heating element within the heating chamber; and
a control system operable to control filling and draining of the heating chamber;
wherein the pipe and nozzle are located within the heating chamber and below the heating element.

2. The steam generator of claim 1 further comprising a drain valve associated with the water draining outlet, water from the nozzle is directed into the drain valve.

3. The steam generator of claim 2 wherein the heating chamber has a generally elongated box-shape with opposed major sidewalls connected by opposed minor sidewalls, the pipe extends from one of the minor sidewalls and generally parallel to the major sidewalls toward the water draining outlet.

4. A steam cooker incorporating the steam generator of claim 1, wherein the steam cooker includes:
a steam cooking chamber plumbed for receiving steam from the steam outlet of the steam generator.

5. The steam generator of claim 1, further comprising a drain valve for controlling water flow through the water draining outlet and an inlet valve for controlling water flow through the water inlet, wherein the control system opens the inlet valve in response to deactivation of the heating system.

6. The steam generator of claim 1 further comprising an unfiltered water source associated with the water inlet to provide unfiltered water during a chamber drain process.

7. The steam generator of claim 6 further comprising a filtered water source associated with the water inlet to provide filtered water during a chamber refill process that follows the chamber drain process.

8. The steam generator of claim 1 wherein the heating chamber is enclosed by a top wall.

9. A steam generator, comprising:
a heating chamber for holding water, the heating chamber having a water inlet nozzle, a steam outlet, and a water draining outlet, the water inlet nozzle aligned and positioned to direct water into the water draining outlet for pushing solids through the water draining outlet;
a heating system associated with the heating chamber for heating water to generate steam;
a control system operable to control filling and draining of the heating chamber; and
a drain valve for controlling water flow through the water draining outlet and an inlet valve for controlling water flow through the water inlet nozzle, the control system connected with the drain valve and the inlet valve, wherein during a generator drain process the control system operates to (i) open the drain valve to permit water to drain from the heating chamber and (ii) open the inlet valve, while maintaining the drain valve open, to permit water emitted by the water inlet nozzle to push solids through the drain valve.

10. A steam generator comprising:
a heating chamber for holding water, the heating chamber having a water inlet, a steam outlet, and a water draining outlet, a nozzle in communication with the water inlet and positioned to direct water into the water draining outlet;
a heating system associated with the heating chamber for heating water to generate steam; and
a control system operable to control filling and draining of the heating chamber; and
a drain valve associated with the water draining outlet and an inlet valve associated with the water inlet, the control system connected with the drain valve and the inlet valve, wherein during a generator drain process the control system operates to (i) open the drain valve to permit water to drain from the heating chamber and (ii) subsequently open the inlet valve, while maintaining the drain valve open, to permit water emitted by the nozzle to push solids through the drain valve.

11. The steam generator of claim 10 wherein the control system is operable such that:
(i) upon initiation of the generator drain process, the heating system is turned OFF, the drain valve is opened and the inlet valve is maintained closed;
(ii) after a certain time period, the inlet valve is switched between open and closed conditions while the drain valve is maintained open and the heating system is maintained OFF; and
(iii) after a set additional time period the drain valve is closed and the inlet valve is maintained open for refilling the heating chamber.

12. The steam generator of claim 10 wherein the control system pulses the inlet valve between open and closed conditions to produce a pulsed impact of water flow into the drain valve.

13. A steam cooker incorporating the steam generator of claim 10, wherein the steam cooker includes:
a steam cooking chamber plumbed for receiving steam from the steam outlet of the steam generator;
a control panel including a generator OFF input, the control system connected with the generator OFF input, the control system initiates the generator draining process in response to user activation of the generator OFF input.

14. The steam generator of claim 10 wherein the heating system comprises a top mounted heating element extending downwardly through a top wall of the heating chamber at a location above a pre-selected water fill line of the heating chamber, the heating element extending downwardly below the pre-selected water fill line in order to heat water in the heating chamber so as to generate steam.

15. The steam generator of claim 14 further comprising multiple top mounted heating elements extending downwardly through the top wall of the heating chamber at locations above the pre-selected water fill line of the heating chamber, the heating elements extending downwardly below the pre-selected water fill line in order to heat water in the heating chamber so as to generate steam.

16. The steam generator of claim 14 wherein the heating element includes a heating coil that is disposed completely below the pre-selected water fill line.

17. The steam generator of claim 14 further comprising a sealing member that provides a seal between the heating element and the top wall of the heating chamber.

18. The steam generator of claim 14 wherein the top wall of the heating chamber takes the form of a lid-type assembly having the heating element integrated therewith.

19. A steam generator comprising:
- a heating chamber for holding water, the heating chamber having a water inlet nozzle, a steam outlet, and a water draining outlet, the water inlet nozzle aligned and positioned to direct water into the water draining outlet for pushing solids through the water draining outlet;
- a heating system associated with the heating chamber for heating water to generate steam;
- a control system operable to control filling and draining of the heating chamber, the control system having an associated water level sensor; and
- wherein the water inlet nozzle is located lower than the water level sensor such that the water inlet nozzle is submerged within water during steam generating operations of the steam generator and during initial draining of the heating chamber.

20. The steam generator of claim 19, further comprising a drain valve for controlling water flow through the water draining outlet and an inlet valve for controlling water flow through the water inlet nozzle, the control system connected with the drain valve and the inlet valve, wherein during a generator drain process the control system operates to (i) open the drain valve to permit water to drain from the heating chamber and (ii) open the inlet valve, while maintaining the drain valve open.

21. The steam generator of claim 19 wherein the heating chamber is enclosed by side, top and bottom walls, the water inlet nozzle positioned toward the bottom wall.

\* \* \* \* \*